United States Patent [19]
Reed et al.

[11] Patent Number: 5,995,653
[45] Date of Patent: *Nov. 30, 1999

[54] DIGITAL IMAGE PROCESSING SYSTEM AND METHOD

[75] Inventors: Alastair M. Reed, Delta; Gary K. Pringle, Surrey; Cristian E. Dunbar, Vancouver, all of Canada

[73] Assignee: Cymbolic Sciences International, Inc., Laguna Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,669

[22] Filed: Nov. 15, 1996

[51] Int. Cl.$^6$ ........................................ G06K 9/00
[52] U.S. Cl. ............................ 382/162; 382/164
[58] Field of Search ..................... 382/162, 164, 382/302; 345/326, 431; 358/520

[56] References Cited

U.S. PATENT DOCUMENTS

| | | |
|---|---|---|
| 5,432,906 | 7/1995 | Newman et al. . |
| 5,463,480 | 10/1995 | MacDonald et al. . |
| 5,500,921 | 3/1996 | Ruetz . |
| 5,564,006 | 10/1996 | Reed ........................................ 345/326 |
| 5,781,666 | 7/1998 | Ishizawa et al. ........................ 382/284 |

*Primary Examiner*—Amelia Au
*Assistant Examiner*—Samir Ahmed
*Attorney, Agent, or Firm*—Elbie R. de Kock

[57] ABSTRACT

A method of transforming input image data into output image data in order to form an output image which comprises a plurality of specified image areas is provided. The method comprises providing a plurality of different sets of color transform look-up tables, associating the different sets of look-up tables with the plurality of specified image areas. The output data is coded to identify an associated one of the different sets of look-up tables responsive to one of the specified image areas for which the output data is being obtained. A color transformation is then performed on the input image data to obtain the output data using one of the different sets of look-up tables identified by the coding. An apparatus for carrying out the method is also provided.

4 Claims, 9 Drawing Sheets

DIGITAL IMAGE PROCESSING SYSTEM AND METHOD

FIELD OF THE INVENTION

This invention relates to a digital image processing system and method. In particular, it relates to a processing system and method for use in a digital color printing operation in which a composite output image, derived from a plurality of different input sources and output rendering intents, is produced.

BACKGROUND OF THE INVENTION

Digital images can be obtained from many different sources. Each of these sources requires a different color transform properly to map its color space to the output image color space. Thus, if more than one type of digital image source is used within an output page several different types of color transformations are required. For example, images obtained from different input devices require a color transform table which is matched to the input device, e.g. various different types of input scanners, or photo CD or digital cameras. Also, photographic images require a different output rendering which preserves relative differences as contrasted with spot colors which require a rendering that preserves an absolute colorimetric match within the available output gamut. A typical output page will contain regions such as spot colors which require an output rendering that preserves an absolute colormetric match within the available output gamut, whereas the rest of the page requires a photographic look output rendering which preserves relative differences. In addition, transformations are required for editing performed by the user which can comprise the whole frame or may be spatially selective.

MacDonald et al in U.S. Pat. No. 5,563,480 describe a method of transforming data into a single acceptable color space. Ruetz, U.S. Pat. No. 5,500,921 recognized the problem of different color output capabilities for different output devices and described the creation and use of a border table to transform unprintable colors to printable colors having equivalent color differentiation and which are therefore perceived as being equivalent. Neither MacDonald et al nor Ruetz addressed the problem of producing an output rendering based on multiple input devices, or of achieving multiple output rendering intents.

It is an object of the present invention to provide a color processing system and method for performing different color transformations in real time during plotting of an output image.

SUMMARY OF THE INVENTION

According to the invention there is provided a digital image processing system, comprising storage means for storing a plurality of different groups of input data; allocating means for associating said different groups of input data with specified image areas in an output image; color modification circuitry comprising a plurality of different sets of color transform look-up tables, said different sets being respectively associated with said different groups of input data, for performing different color transformations to transform the input data into output data for forming the output image; and means for switching in real time between said different sets of look-up tables for performing said different color transformations responsive to said specified image areas in the output image.

The means for switching in real time between the different sets of look-up tables may comprise means for allocating a code to individual pixels forming said output image, said code being associated with one of said different sets of color transform look-up tables for identifying a particular one of said different sets of color transform look-up tables for use in calculating an individual pixel.

The system may further comprise a plurality of input devices for respectively providing said different groups of input data.

The system may further comprise a user interface for manipulation by a user in order to calculate one of the sets of color transform look-up tables.

Also according to the invention there is provided a method of transforming input image data into output image data in order to form an output image comprising a plurality of specified image areas, comprising the steps of providing a plurality of different sets of color transform look-up tables; associating said different sets of look-up tables with said plurality of specified image areas; coding the output data to identify an associated one of said different sets of look-up tables responsive to one of said specified image areas for which the output image data is being obtained; and performing a color transformation on said input image data to obtain the output data using one of said different sets of look-up tables identified by the coding.

Other objects and advantages of the invention will become apparent from the description of a preferred embodiment of the invention below.

BRIEF DESCRIPTION OF THE DRAWINGS

The invention will now be described, by way of examples, with reference to the accompanying drawings, in which.

DESCRIPTION OF PREFERRED EMBODIMENT

Figure 1:
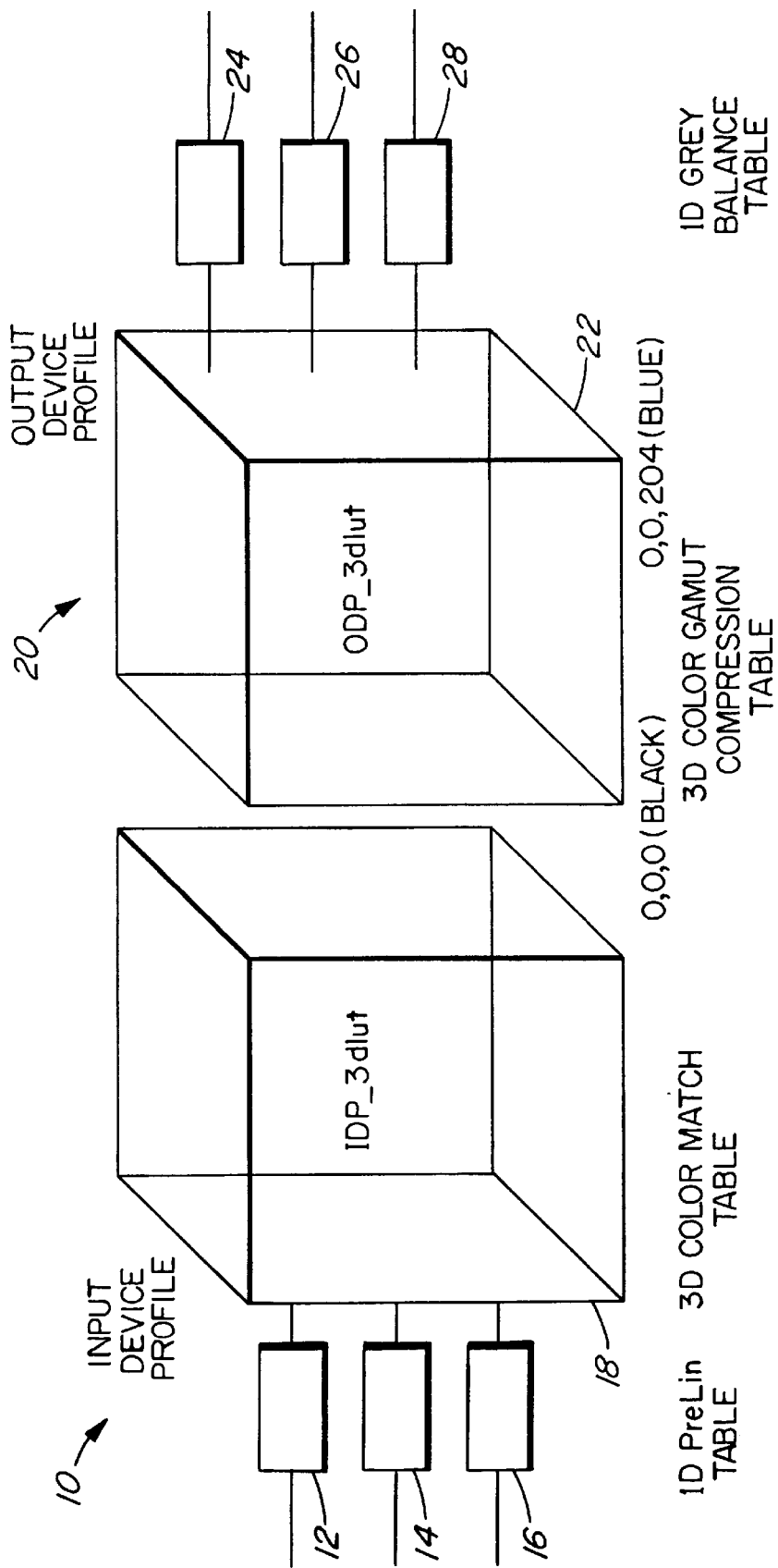
FIG. 1 is a diagrammatical illustration of an input device profile and an output device profile in a color transform system.

A color transform is used to effect a transformation from an input device color space to an ideal color space and from an ideal color space to an output device color space, as illustrated in FIG. 1.

The first transformation involves an input device profile 10 which comprises three one-dimensional pre look-up tables 12, 14 and 16 and a three-dimensional color match look-up table 18. The second transformation involves an output device profile 20 which comprises a three-dimensional color gamut compression table 22 and three one-dimensional post look-up tables 24, 26 and 28.

When mapping from an input material with a large gamut to an output material with a smaller gamut, for example in dealing with photographic images, color calibration of the output material generally comprises two main rendering intents, i.e. (i) Equal Perceptual Photographic mapping, which entails obtaining equal perceptual steps along the grey axis and any color axis of an ideal color cube; and (ii) Exact Colorimetric Match mapping, which entails obtaining an exact calorimetric match along the grey axis and any color of an ideal color cube for any color within the output material gamut.

Figure 2:
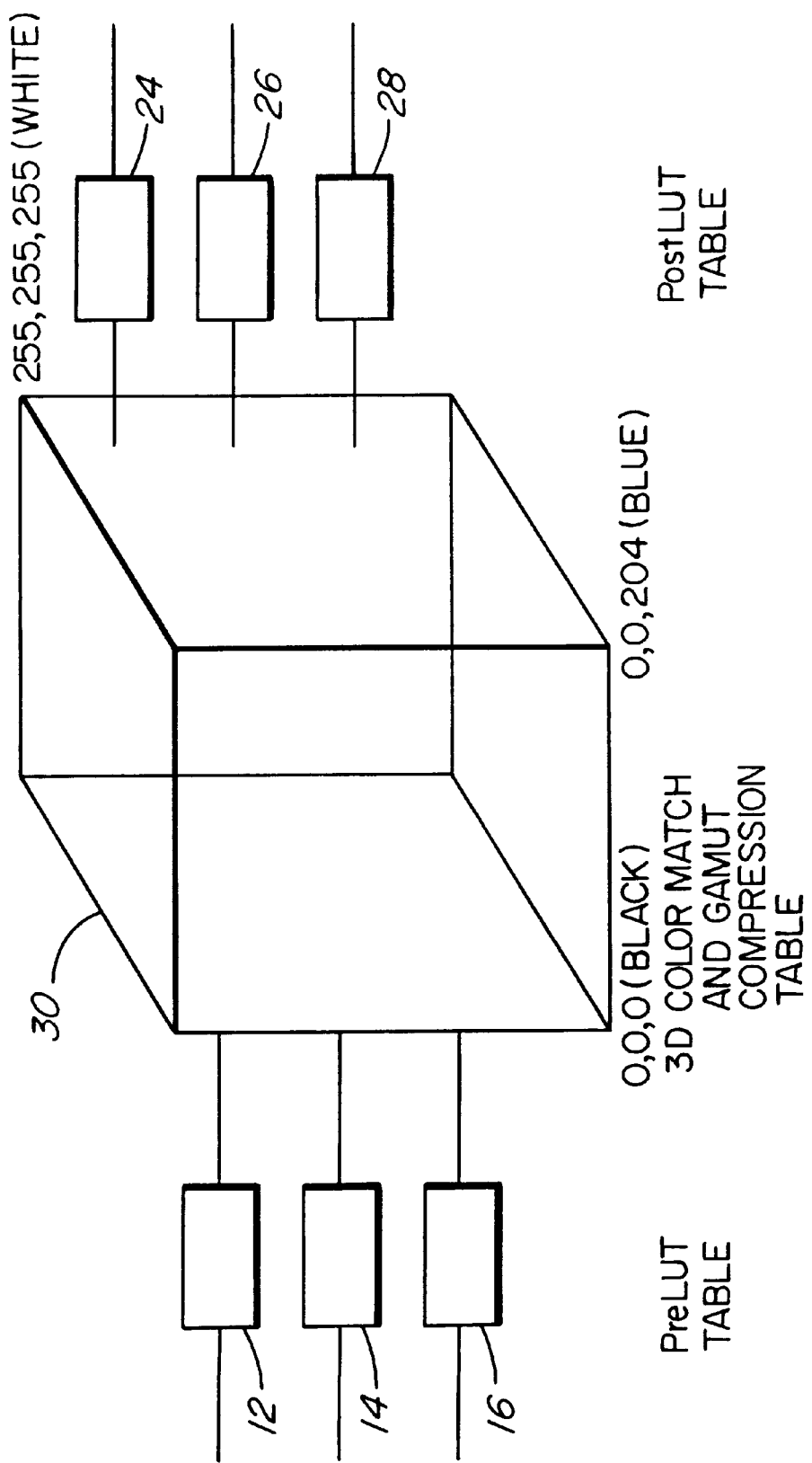
FIG. 2 is a diagrammatical illustration of a color transform in which the three-dimensional look-up tables of the input and output device profiles have been concatenated.

The Equal Perceptual Photographic rendering intent comprises grey balance and equal perceptual steps which function is performed by the three one-dimensional post look-up tables 24, 26 and 28, independently calculated for red, green and blue. The three-dimensional look-up table 22 is used to perform color gamut compression for output materials that require a different response along the pure color axis than along the grey axis. The type of color gamut compression which is used depends on the output rendering intent, i.e. photographic rendering or calorimetric match. The three-dimensional color gamut compression look-up table 22 can be concatenated with the three-dimensional color matching table 18 to produce a single combined table, as described in U.S. Pat. No. 5,432,906, or they may be implemented separately. Concatenating the look-up tables reduces computation. A composite three-dimensional color match and gamut compression table 30 is shown in FIG. 2.

Figure 3:
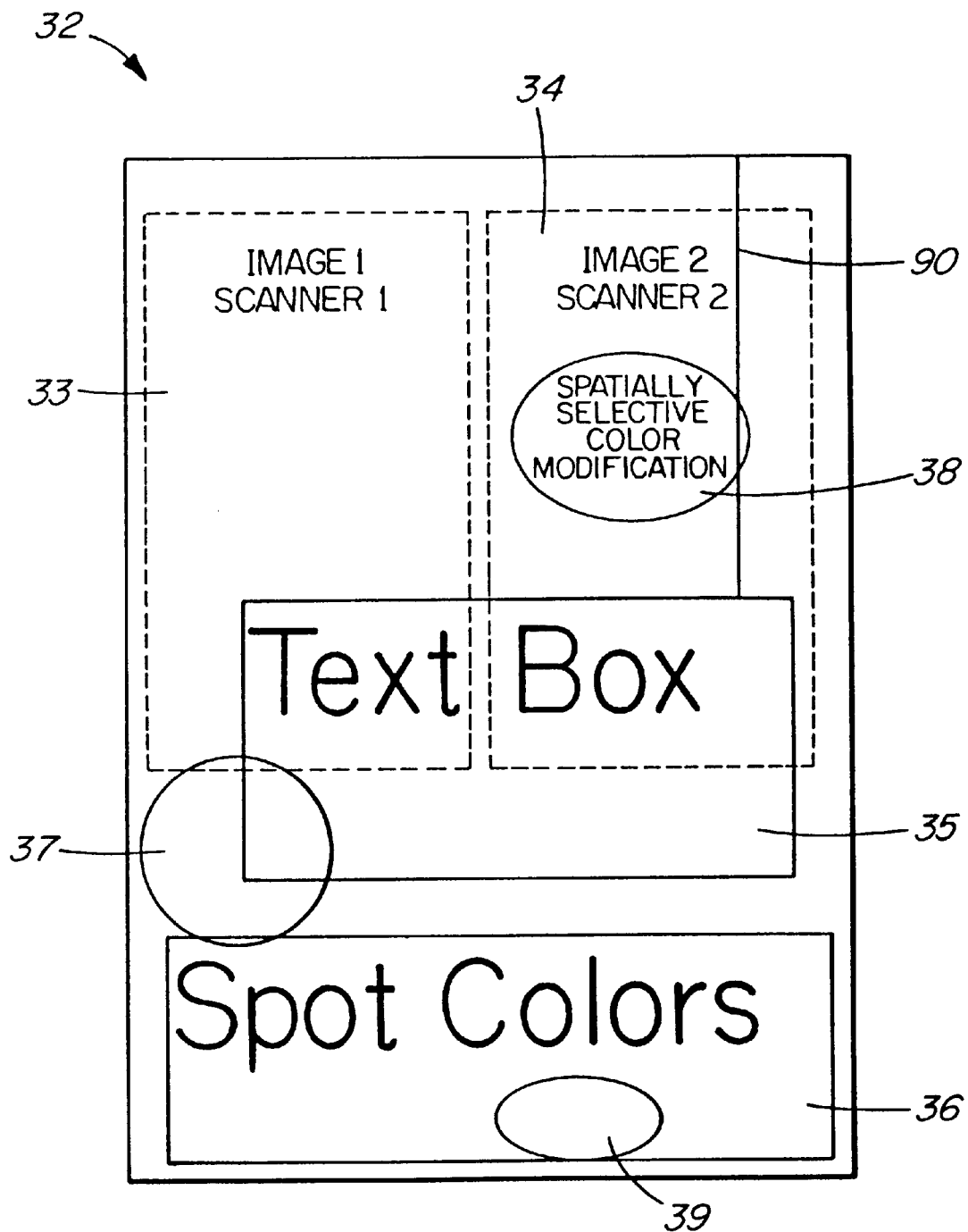
FIG. 3 is a graphic illustration of a planned page file as used in the method according to the invention.

On a single output page, several different types of color transforms may be required as shown in FIG. 3. In the example shown in FIG. 3, the output page, generally indicated by reference numeral 32, is composed of different areas containing different source material, such as images, indicated by reference numerals 33 and 34, obtained from different scanners, areas containing text and spot colors, indicated by reference numerals 35 and 36, respectively. In addition, there is an area 37, containing an image from a digital camera, another area 38 containing user edit specifications which can extend over the whole of the image or only over a part thereof, as shown. There is also an area 39 containing an image from a Photo CD. All the above require different color transforms.

Figure 4:
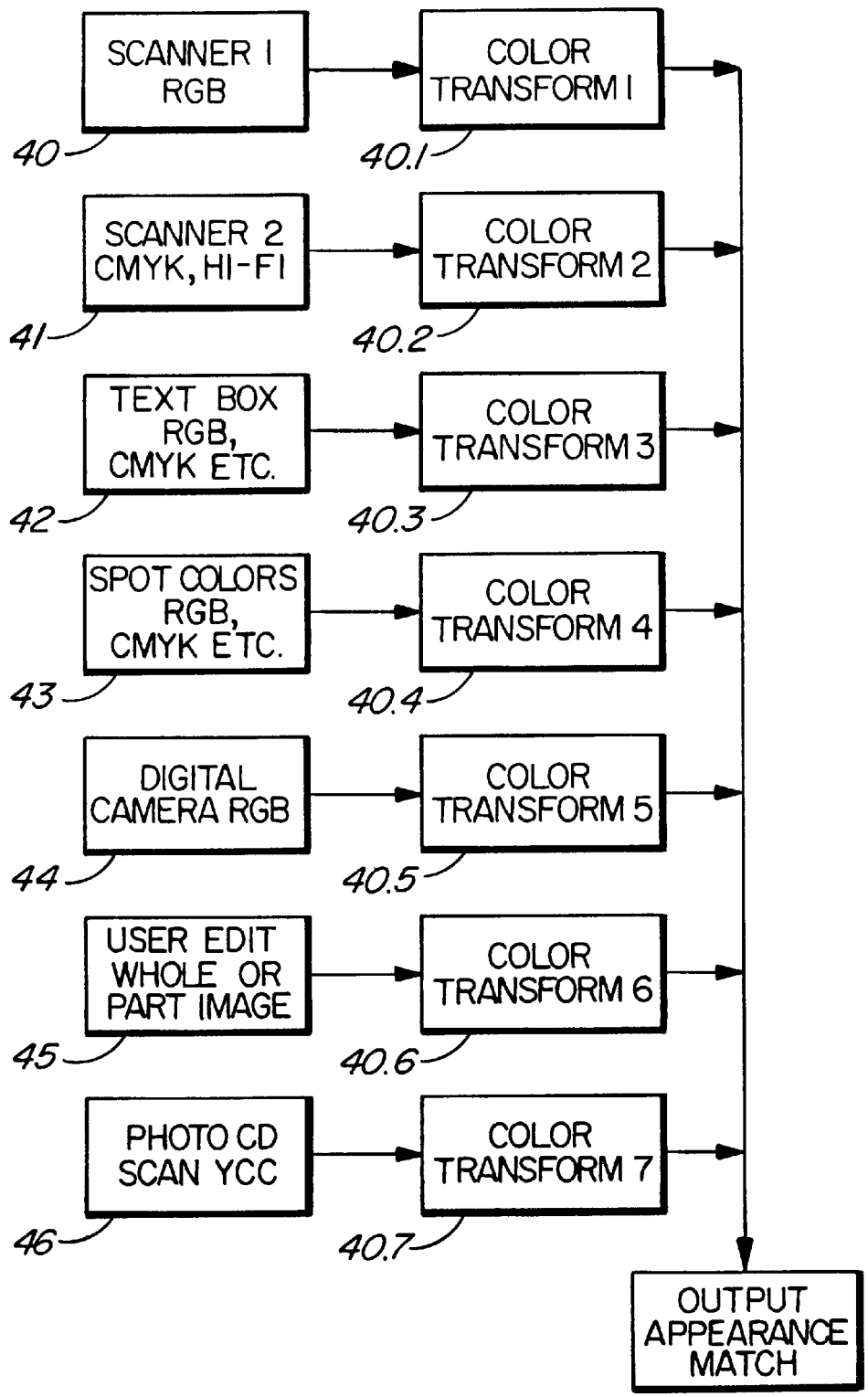
FIG. 4 is a diagrammatical representation of different color transforms involved in a color transformation.

In FIG. 4, the boxes 40 to 46, respectively, represent the different types of input data; i.e. from the first and second scanners, text material, spot color, digital camera, user edits and photo CD. The corresponding color transforms are indicated by the boxes 40.1 to 40.7, respectively.

Figure 5:
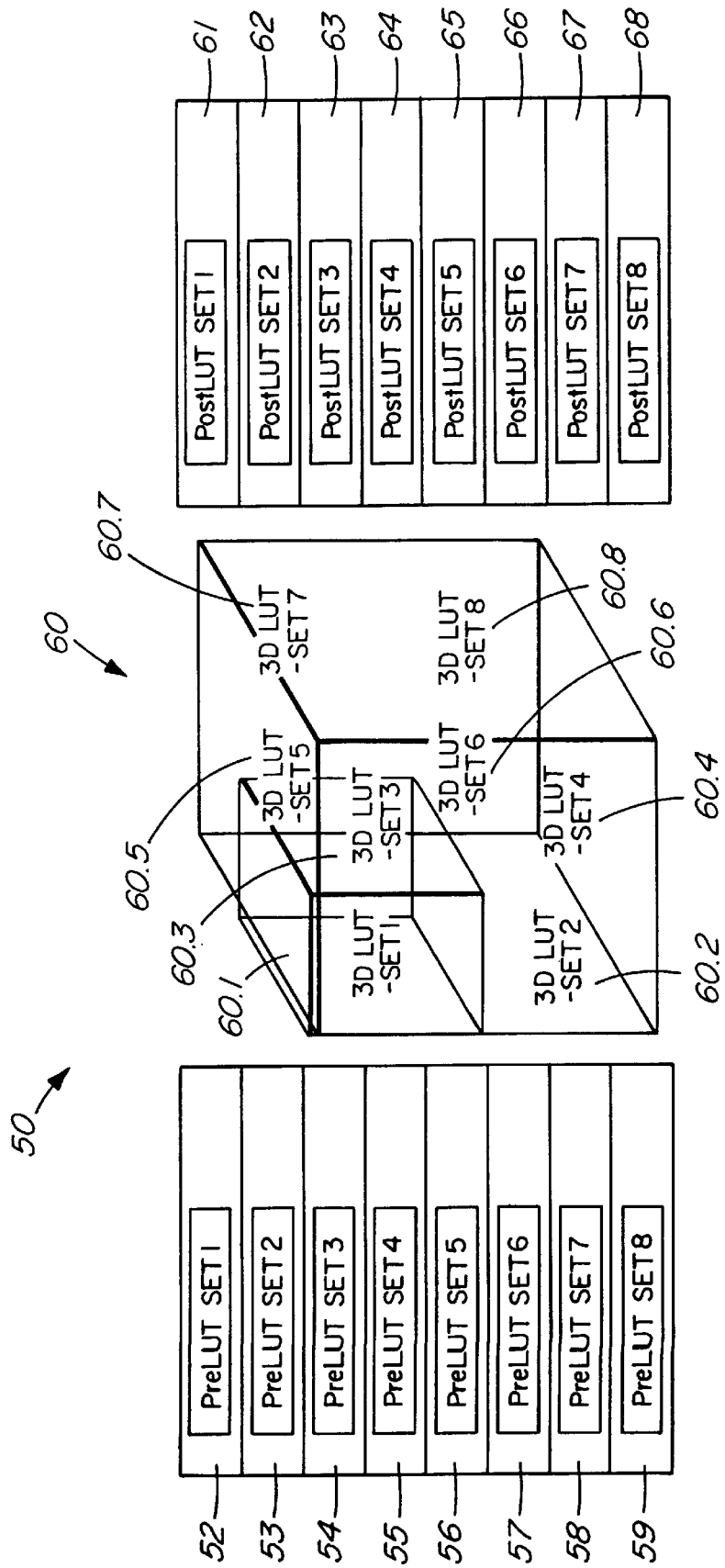
FIG. 5 is a diagrammatical illustration of a color transform system according to the invention.
Figure 6:
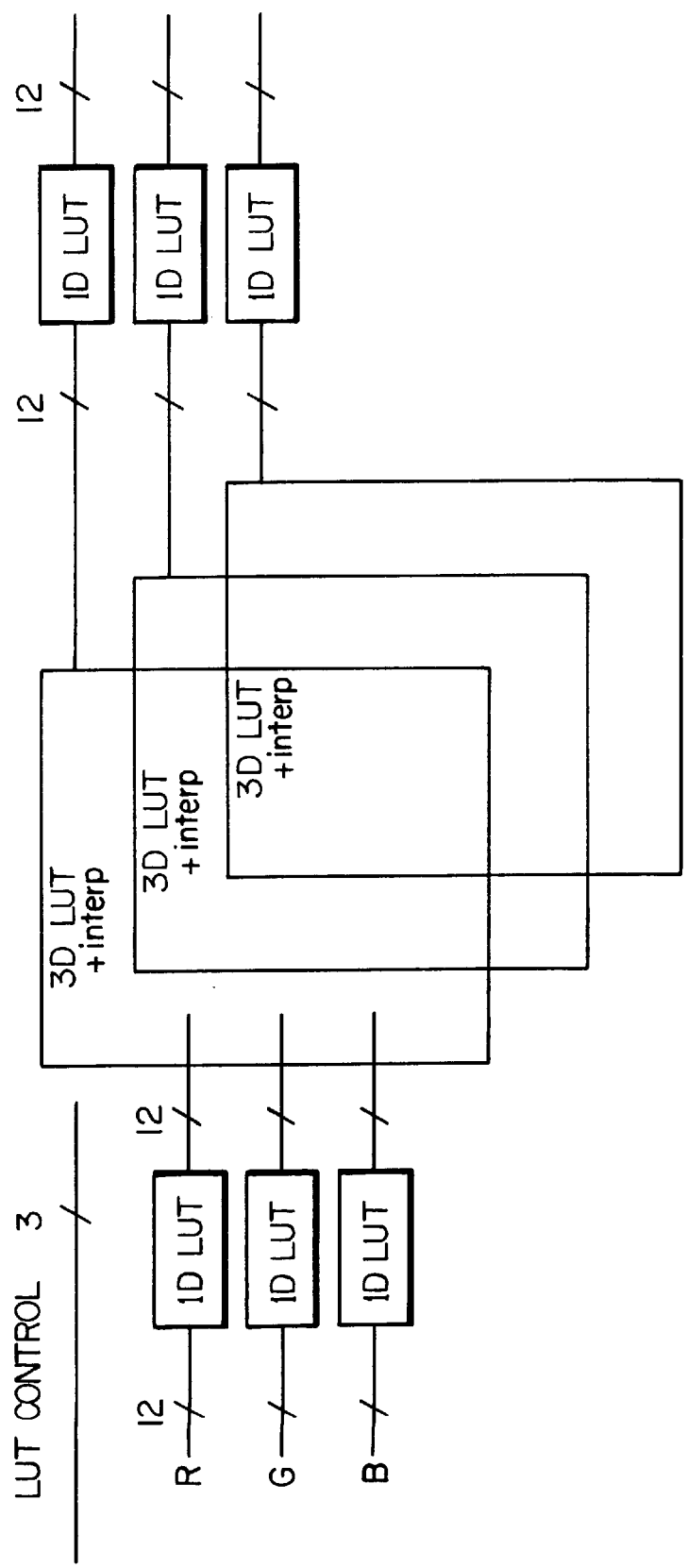
FIGS. 6 to 9, represent different embodiments of the color transform system of FIG. 5 for different sets of input and output colors.
Figure 7:
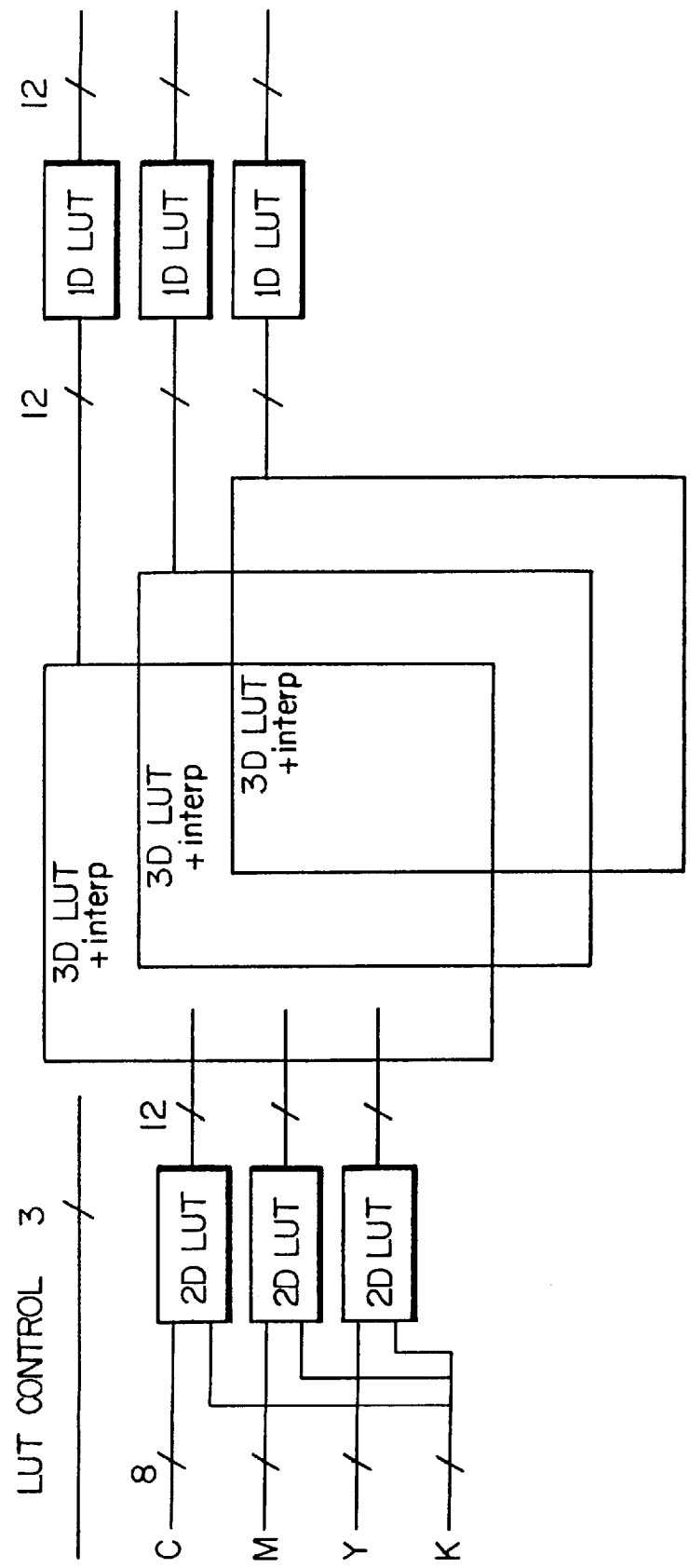
Figure 8:
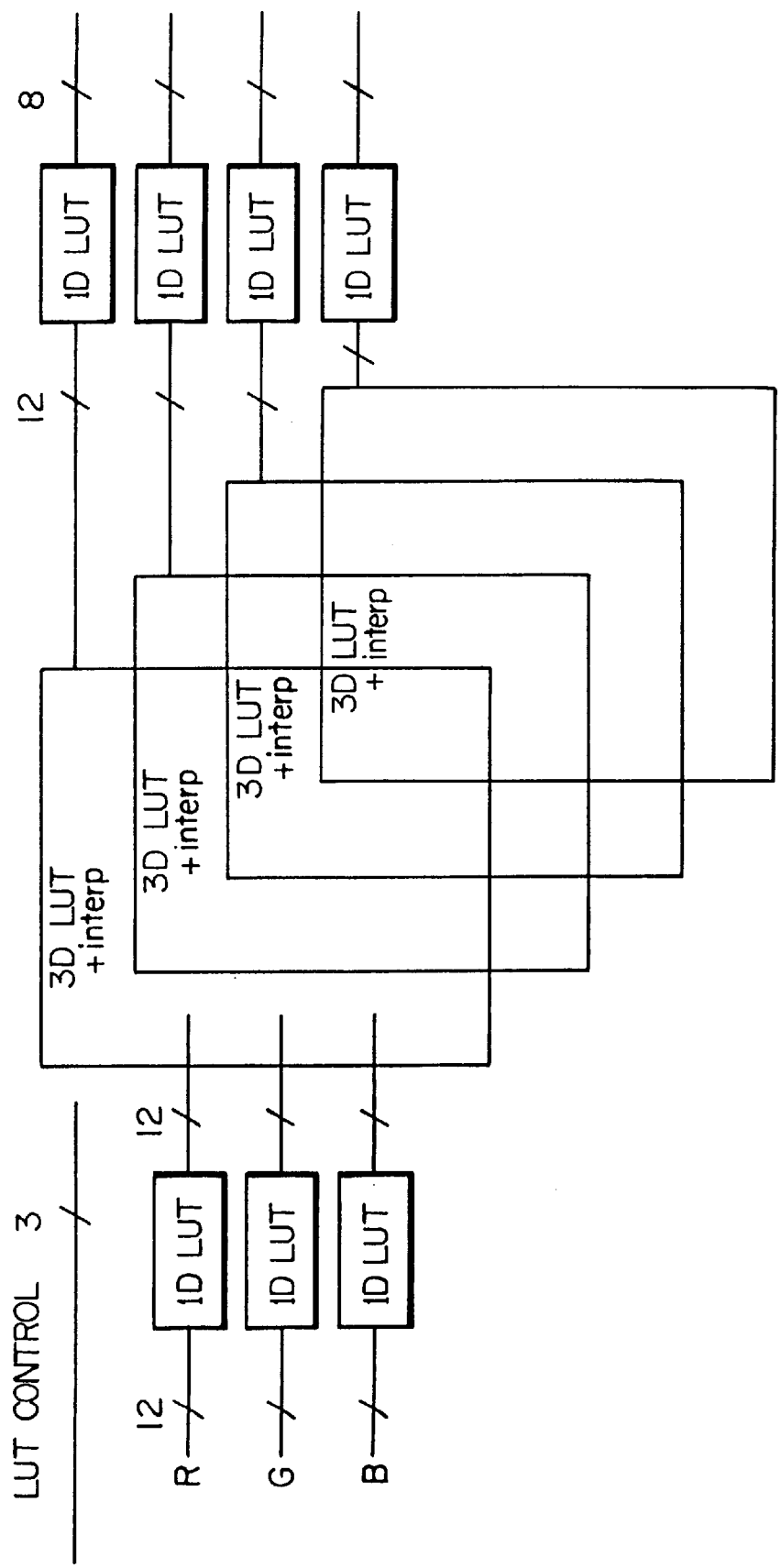
Figure 9:
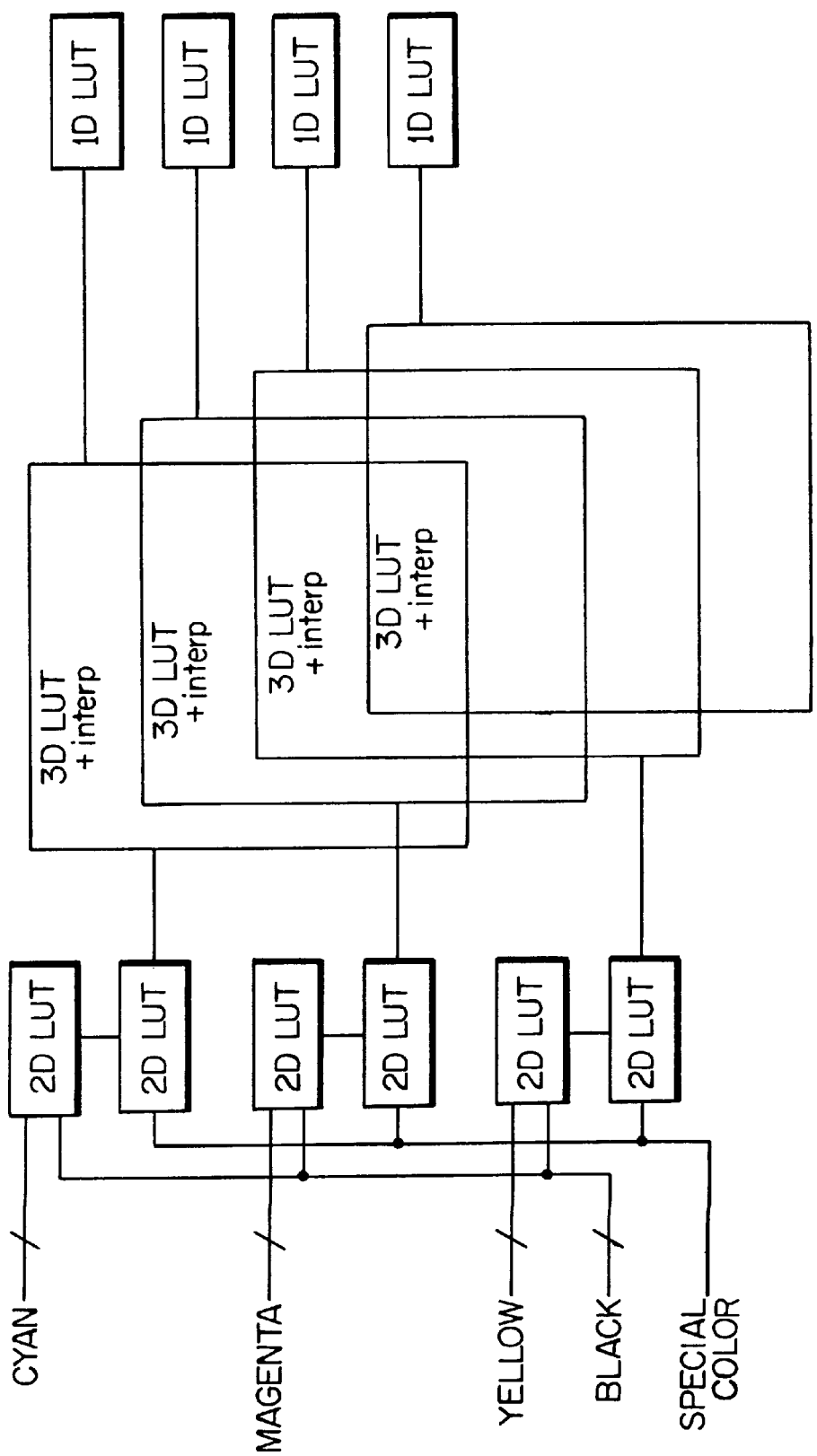

In order to accomplish the use of such several different color transforms in real time as an image is being plotted, the present invention provides a color transformation system as shown in FIG. 5.

In the present example the system 50 incorporates 8 sets of color transform look-up tables, indicated as Sets 1 to 8, respectively. A set of color transform tables consists of a number of one-dimensional or two-dimensional pre look-up tables, followed by a single three-dimensional look-up table, followed by a number of one-dimensional post look-up tables, as shown in FIGS. 6, 7, 8 and 9. As shown, each set of color transform look-up tables comprises a number of one-dimensional pre look-up tables 52 to 59, a three-dimensional look-up table 60 and a number of one-dimensional post look-up tables 61 to 68. The look-up table 60 is a combination of eight separate three dimensional look-up tables 60.1 to 60.8, one for each of the Sets 1 to 8.

A set of three control bits is assigned to each pixel to identify the particular set of color transform tables to be used. Thus, by having three control bits, up to 8 sets of color transform tables can be selected in real time as an image is being plotted. These 8 sets of look-up tables can be used to perform different color transforms on the fly while plotting an output image.

Thus, while plotting a line of pixels, e.g. along the line indicated at 90 in FIG. 3, the border area may for example use transform 40.4. When the area 34 is reached, the system 50 will switch to transform 40.2, corresponding with the transform required for this image. When the area 38 is reached, the system 50 switches to color transform 40.6. When the area 35 is reached, the system 50 switches to the transform 42, and so on until the line is completed and the next line is started. The switching between the color transforms is effected by identifying the previously assigned control bits for each pixel as the pixels are being plotted.

FIGS. 6 to 9, respectively, illustrate examples of the configuration of the look-up tables for the following cases:
  (a) Three colors in and three colors out;
  (b) Greater than three colors in and three colors out;
  (c) three colors in and greater than three colors out; and
  (d) greater than three colors in and greater than three colors out.

The look-up table configurations under (d) above are described in U.S. Ser. No. 08/251,689 the entire contents of which is incorporated herein by reference. More sets of color transform tables can be used depending on the number required on one output page.

In FIGS. 6 to 9, the designation LUT Control represents software or circuit means for switching between sets of look-up tables and transforms according to the indication provided by the control bits associated with successive pixels.

While only preferred embodiments of the invention have been described herein in detail, the invention is not limited thereby and modifications can be made within the scope of the attached claims.

What is claimed is:

1. A digital image processing system, comprising:
   storage means for storing a plurality of different groups of input data;
   allocating means for associating said different groups of input data with specified image areas in an output image;
   color modification circuitry comprising a plurality of different sets of color transform look-up tables,
   said different sets being respectively associated with said different groups of input data, for performing different color transformations to transform the input data into output data or output rendering intents for forming the output image; and means for switching in real time between said different sets of look-up tables for performing said different color transformations responsive to said specified image areas in the output image, wherein said means for switching in real time between the different sets of look-up tables comprises means for allocating a code to individual pixels forming said output image, said code being associated with one of said different sets of color transform look-up tables for identifying a particular one of said different sets of color transform look-up tables for use in calculating an individual pixel.

2. A method of transforming input image data into output image data in order to form an output image comprising a plurality of specified image areas, comprising the steps of:

providing a plurality of different sets of color transform look-up tables;

associating said different sets of look-up tables with said plurality of specified image areas;

coding the output data to identify an associated one of said different sets of look-up tables responsive to one of said specified image areas for which the output image data in being obtained; and performing a color transformation on said input image data to obtain the output data by switching in real time between said different mots of look-up tables identified by the coding, wherein said coding comprises allocating a code to individual pixels forming said output image for identifying a particular one of said different sets of color transform look-up tables for use in calculating an individual pixel.

3. The system according to claim 1, further comprising a plurality of input devices for respectively providing said different groups of input data.

4. The system according to claim 3, further comprising a user interface for manipulation by a user in order to compose one of said sets of color transform look-up tables.

* * * * *